United States Patent Office 3,374,053
Patented Mar. 19, 1968

3,374,053
PROCESS FOR PREPARING VANADIUM
OXYCHLORIDE
Albert Krettler and Ernst Dönges, Frankfurt am Main,
Germany, assignors to Farbwerke Hoechst Aktienge-
sellschaft vormals Meister Lucius & Bruning, Frank-
furt am Main, Germany, a corporation of Germany
No Drawing. Filed June 22, 1965, Ser. No. 466,481
Claims priority, application Germany, June 27, 1964,
F 43,283
4 Claims. (Cl. 23—21)

ABSTRACT OF THE DISCLOSURE

A process has been provided for preparing vanadium oxychloride by reacting vanadium pentoxide with a chlorinating agent in the presence of an excess of vanadium oxychloride as the reaction medium. A suitable chlorinating agent is thionyl chloride. Improved yields on absolute as well as space-time basis are obtained.

The present invention relates to a process for preparing vanadium oxychloride by reacting vanadium pentoxide with a chlorinating agent.

Various methods are known for preparing vanadium oxychloride. According to Inorganic Syntheses, volume 1, New York, 1939, page 106, vanadium pentoxide is reduced with hydrogen or carbon at a temperature in the range of from 600° C. to 1000° C. to vanadium trioxide, which is then transformed into vanadium oxychloride by a treatment with chlorine at a temperature of 500–600° C. The final product obtained is strongly contaminated with vanadium tetrachloride and chlorine and, therefore, repeated distillation over sodium is recommended for purification. Still further, it is known to react vanadium pentoxide with chlorine in the absence of a reducing agent and at a temperature above 600° C. It is likewise possible to conduct dry hydrogen chloride over vanadium pentoxide at elevated temperature and in the presence of phosphorus pentoxide. This latter process has not been used in industry. According to H. Hecht, G. Jander, H. Schlapmann, Zeitschrift für Anorganische und Allgemeine Chemie, volume 254 (1947), page 255, vanadium pentoxide is reacted with thionyl chloride to give vanadium oxychloride and sulfur dioxide

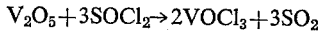

This method yields acceptable results when carried out on a reduced scale but on an industrial scale it is beset with considerable drawbacks. Even when carried out on a reduced scale the reaction takes 6 to 8 hours. Moreover, the yield, which has not been indicated in literature, amounts to 60–80% only, calculated on the vanadium pentoxide used, as ascertained by experiments in our laboratories. In the first place, however, the space-time yield is very low. On a kilogram scale space-time yields of only 38 grams of vanadium oxychloride were obtained per hour and liter of reaction space.

The present invention provides a process for preparing vanadium oxychloride by reacting vanadium pentoxide with a chlorination agent at elevated temperature and using vanadium oxychloride as reaction medium.

According to the invention the reaction is carried out at a temperature in the range of from 80 to 200° C., advantageously 100 to 150° C. If the reaction is to be carried out at a temperature above the boiling point of the chlorination agent moderately elevated pressures are to be applied.

As chlorination agents there can be used those which are suitable for reducing chlorination, preferably thionyl chloride, phosgene and sulfur monochloride ($S_2Cl_2$).

The process according to the invention can be carried out discontinuously or continuously. For the discontinuous process vanadium pentoxide is dissolved or suspended at elevated temperature in vanadium oxychloride, advantageously in a molar ratio in the range of from 1:5 to 1:25. The chlorination agent is then added in portions as the reaction proceeds. At the end of the reaction, it is suitable to add the chlorination agent slowly or to add it in a deficiency in order to avoid secondary reactions which may involve decomposition of the chlorination agent. Moreover, it is advantageous to cool the reflux intensely, for example with a brine of common salt of —10 to —15° C. so that the escaping sulfur dioxide is just prevented from being liquefied and the losses of vanadium oxychloride are kept as low as possible. When stoichoimetric amounts of the reactants are added, the yield of vanadium oxychloride is almost quantitative (98–99%).

In the continuous process vanadium pentoxide and chlorination agent are introduced in a stoichiometric proportion, as the reaction proceeds and at elevated temperature, into the vanadium oxychloride which contains at the beginning of the reaction an excess of vanadium pentoxide suitably amounting to 4 to 20% of the molar amount of the vanadium oxychloride first placed into the reaction vessel. The newly formed vanadium oxychloride is passed, together with the sulfur dioxide, through a cooling column connected with a descending condenser at the end of which liquid vanadium oxychloride and gaseous sulfur dioxide are obtained. The sulfur dioxide may likewise be eliminated at the head of the column. When operating in this manner the yields are almost quantitative, too.

In comparison to the method of Hecht the process of the invention offers the advantage that, owing to the use of vanadium oxychloride as reaction medium, the reaction temperature can be considerably increased whereby a higher yield is obtained. Above all, the space-time yield is ten times higher than in the conventional process. For example, when the process is carried out discontinuously 400 grams of $VOCl_3$ are obtained per hour and liter of reaction space. Thus, it becomes possible to reduce the expenditure pertaining to apparatus for the industrial performance of the process. In the process according to the invention the vanadium oxychloride is obtained with a high purity so that in many cases a rectification can be dispensed with. The product can be directly used, for example as catalyst component for the copolymerization of ethylene and propylene.

The following examples serve to illustrate the invention but they are not intended to limit it thereto.

*Example 1*

In a round flask provided with stirrer, reflux condenser and dropping funnel 9.60 grams of vanadium pentoxide were suspended or dissolved in 186.9 grams of vanadium oxychloride. The mixture was heated at reflux temperature and 18.65 grams of thionyl chloride were dropped in over a period of 30 minutes. The reflux condenser was cooled by circulating brine of —10 to —15° C. in a manner such that the sulfur dioxide formed in the reaction escaped with a temperature of —8.5 to —9.5° C. When the addition of thionyl chloride was terminated, the reaction mixture was heated for some further minutes with reflux and while stirring until the temperature of the liquid phase amounted to at least 125° C. The reaction mixture was then distilled to dryness with descending condenser. 98.3% of vanadium oxychloride were obtained, calculated on the vanadium pentoxide used.

Example 2

In a 2 liter flask provided with stirrer, reflux condenser with circulating brine (cf. Example 1) and a trap through which vanadium pentoxide could be introduced during boiling, 272.85 grams (1.5 mols) of vanadium pentoxide and an excess of further 90.95 grams (0.5 mol) of vanadium pentoxide were dissolved or suspended in 1382.3 grams of vanadium oxychloride. 520.5 grams (4.37 mols) of thionyl chloride were then added over a period of 80 minutes and under reflux. The sulfur dioxide escaping through the reflux condenser was condensed in a trap cooled by means of Dry Ice in acetone together with small amounts of entrained vanadium oxychloride. When the addition of thionyl chloride was terminated the reaction mixture was heated for a further 30 minutes while stirring. 284 millimols (519 grams) of vanadium oxychloride were then distilled off.

1.5 mols of vanadium pentoxide were newly added and 4.37 mols of thionyl chloride were introduced over a period of 80 minutes. The reaction mixture was again stirred for 30 minutes and the same amount of vanadium oxychloride was distilled off.

The reaction was repeated in this manner nine times. The reaction mixture was then evaporated to dryness in order to recover the vanadium oxychloride initially used as reaction medium. 2306.1 grams of vanadium pentoxide were reacted and 4351.8 grams of vanadium oxychloride were obtained therefrom, corresponding to a yield of 99.1% of the theory. The unreacted vanadium pentoxide could be used for further reactions.

We claim:

1. A process for preparing vanadium oxychloride by reacting vanadium pentoxide with a chlorination agent at elevated temperature, which comprises carrying out the reaction in vanadium oxychloride as reaction medium in a molar ratio of the vanadium pentoxide to vanadium oxychloride from 1:5 to 1:25.

2. The process of claim 1, wherein the chlorination agent is thionyl chloride, phosgene or sulfur monochloride.

3. The process of claim 1, wherein the reaction is carried out at a temperature in the range of from 80 to 200° C.

4. The process of claim 1, wherein the reaction is carried out at a temperature in the range of from 100 to 150° C.

References Cited

UNITED STATES PATENTS

| | | | |
|---|---|---|---|
| 2,053,174 | 9/1936 | Booth | 23—88 |
| 3,071,437 | 1/1963 | Quarles | 23—153 |
| 3,111,380 | 11/1963 | Braus et al. | 23—85 |

FOREIGN PATENTS 591,798  2/1960  Canada.

OTHER REFERENCES

Chemical Abstracts, Oct. 25, 1958, page 17093.

A.P.C. application of Walter Beck et al., Ser. No. 393,258, published July 13, 1943 (abandoned).

OSCAR R. VERTIZ, *Primary Examiner.*

EDWARD STERN, *Examiner.*